United States Patent [19]

Kobayashi et al.

[11] Patent Number: 5,161,032
[45] Date of Patent: Nov. 3, 1992

[54] VELOCITY ERROR GENERATOR WITH FIRST-ORDER INTERPOLATION

[75] Inventors: Yuji Kobayashi; Tsutomu Takamori, both of Kanagawa, Japan

[73] Assignee: Sony Corporation, Tokyo, Japan

[21] Appl. No.: 593,393

[22] Filed: Oct. 2, 1990

Related U.S. Application Data

[63] Continuation of Ser. No. 317,093, Feb. 27, 1989, abandoned, which is a continuation of Ser. No. 825,591, Feb. 3, 1986, abandoned.

[30] Foreign Application Priority Data

Feb. 13, 1985 [JP] Japan .................................. 60-24421

[51] Int. Cl.⁵ .............................................. H04N 9/89
[52] U.S. Cl. ..................................................... 358/326
[58] Field of Search ................................ 358/320–327, 358/337–338; 360/36.1–36.2

[56] References Cited

U.S. PATENT DOCUMENTS

| | | | |
|---|---|---|---|
| 3,860,952 | 1/1975 | Tallent et al. | 358/326 X |
| 4,081,826 | 3/1978 | Ninomiya | 358/326 X |
| 4,165,524 | 8/1979 | Ninomiya | 358/326 X |
| 4,321,619 | 3/1982 | Kamath | 358/326 |
| 4,393,413 | 7/1983 | Kaneko | 358/326 |
| 4,443,821 | 4/1984 | Kato | 358/326 |

FOREIGN PATENT DOCUMENTS 0230310 7/1987 European Pat. Off.

*Primary Examiner*—Wayne R. Young
*Attorney, Agent, or Firm*—Lewis H. Eslinger; Jay H. Maioli

[57] ABSTRACT

There is an apparatus for generating a velocity error signal for use in a time base corrector. This apparatus comprises: an A/D converter that converts a velocity error to a digital signal that is fed to a summing circuit to convert it to a phase shift amount. A zero value interpolation circuit multiplies the sampling frequency of the phase shift amount with an integer and a digital low-pass filter interpolates an output signal of the interpolation circuit. A differentiating circuit to convert an interpolated phase shift amount of an output signal of the LPF to a phase difference and a D/A converter 9 converts the digital phase difference data to an analog signal. With this apparatus, the velocity error can be accurately corrected.

6 Claims, 8 Drawing Sheets

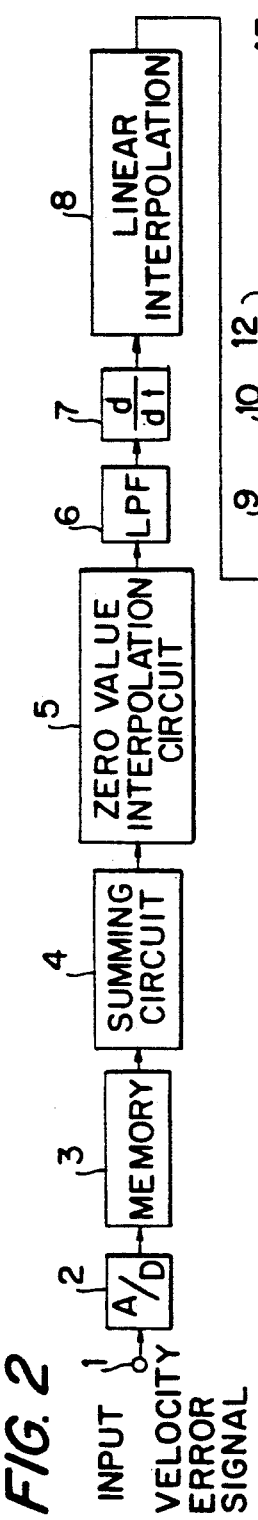
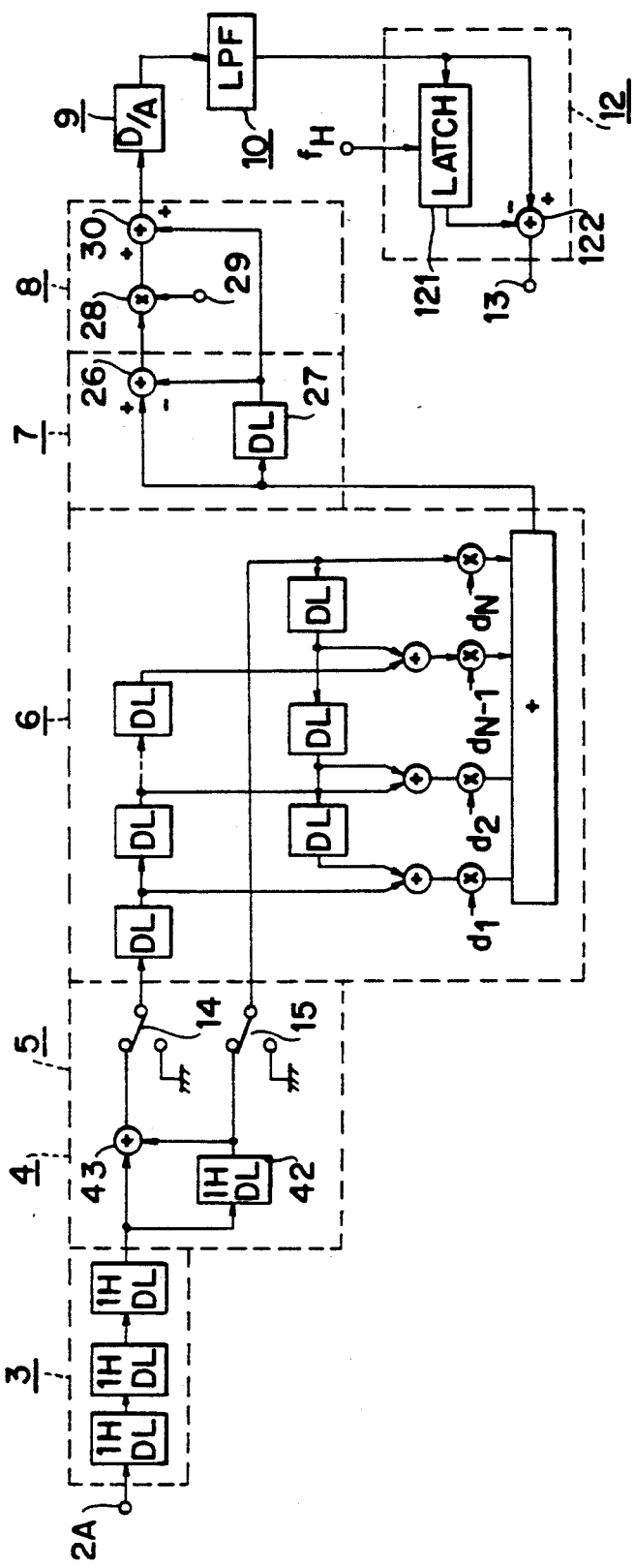
FIG. 2
FIG. 3

VELOCITY ERROR GENERATOR WITH FIRST-ORDER INTERPOLATION

This is a continuation of application Ser. No. 07/317,093, filed Feb. 27, 1989 now abandoned which is a continuation of application Ser. No. 06/825,591, filed Feb. 3, 1986.

BACKGROUND OF THE INVENTION

1. Field of the Invention

The present invention relates to an apparatus for generating a velocity error signal which is used in a time base corrector (TBC).

2. Description of the Prior Art

The TBC (Time Base Corrector) to remove the time base fluctuation in the color video signal reproduced from a record medium such as a VTR is known. In the TBC, a write clock is formed from a continuous wave synchronized with a burst signal in the color video signal, the digitized color video signal is written into a memory by means of this write clock, and the digital color video signal is read out from the memory by a reference read clock.

Since the burst signal exists for every one horizontal period (1H), it is possible to generate the instantaneous phase difference between the current burst signal and the clock synchronized with the phase of the burst signal which is 1H precedent to the current burst signal, namely. In other words, the velocity error is generated. The velocity error and its correction will be described with reference to FIGS. 1A to 1F.

FIG. 1A shows a color video signal reproduced from, for example, a VTR. The color video signal has a horizontal sync signal HD and a burst signal $S_b$ for every 1H. The burst signal $S_b$ is separated by a burst gate circuit and supplied to an APC (Automatic Phase Control) circuit, so that a clock signal synchronized with the burst signal is formed as shown in FIG. 1B. By means of this clock signal, the color video signal is analog-to-digital (A/D) converted and stored into a memory. FIG. 1C shows the true phase variation which is included in the reproduced color video signal.

In this way, the phase difference, namely the velocity error between the clock signal which was automatically phase controlled by the burst signal which is 1H precedent to the current burst signal and the burst signal for the current horizontal period changes as shown in FIG. 1D. To remove the the phase variation in the reproduced color video signal a read clock of the memory of the TBC is phase modulated due to the velocity error.

As one of the conventional corrections of the velocity error, the linear correction to linearly interpolate the values of the phase differences which are obtained on a 1H-unit basis has been known. This linear correction relates to the method whereby the phase variation for 1H is linearly approximated as shown in FIGS. 1E and 1F.

The velocity error obtained by the conventional linear correction (i.e., first order correction) is approximated by a straight line, so that there is a drawback such that it doesn't coincide with the true velocity error variation.

OBJECT AND SUMMARY OF THE INVENTION

It is an object of the present invention to provide an apparatus for generating a velocity error signal in which a precision of approximation can be improved as compared with the linear approximation.

According to this invention, there is provided an apparatus for generating an improved velocity error signal comprising an A/D converter 2 for converting a velocity error to a digital signal; means 4 for converting an output signal of the A/D converter 2 to a summed phase shift amount, sampling rate converting means 5 for multiplying a sampling rate of the phase shift amount with an integer; a digital low-pass filter 6 for interpolating an output of the sampling rate converting means 5; means 7 for returning an output signal of the digital low-pass filter 6 to a phase difference; and a D/A converter 9 for converting the phase difference data to an analog signal.

In this invention, the phase difference information of a unit of 1H is regarded as the discrete data of the velocity error which is sampled at the horizontal synchronizing frequency. After the phase difference is converted to a phase shift amount, the values between the inherent sampling points are interpolated by a digital low-pass filter.

The above and other objects and features of the present invention will become apparent from the following detailed description and the appended claims with reference to the accompanying drawings.

BRIEF DESCRIPTION OF THE DRAWINGS

FIG. 2 is a block diagram of an embodiment of the present invention;

FIG. 3 is a more practical block diagram of the embodiment of the invention;

DETAILED DESCRIPTION OF PREFERRED EMBODIMENTS

Figure 1:
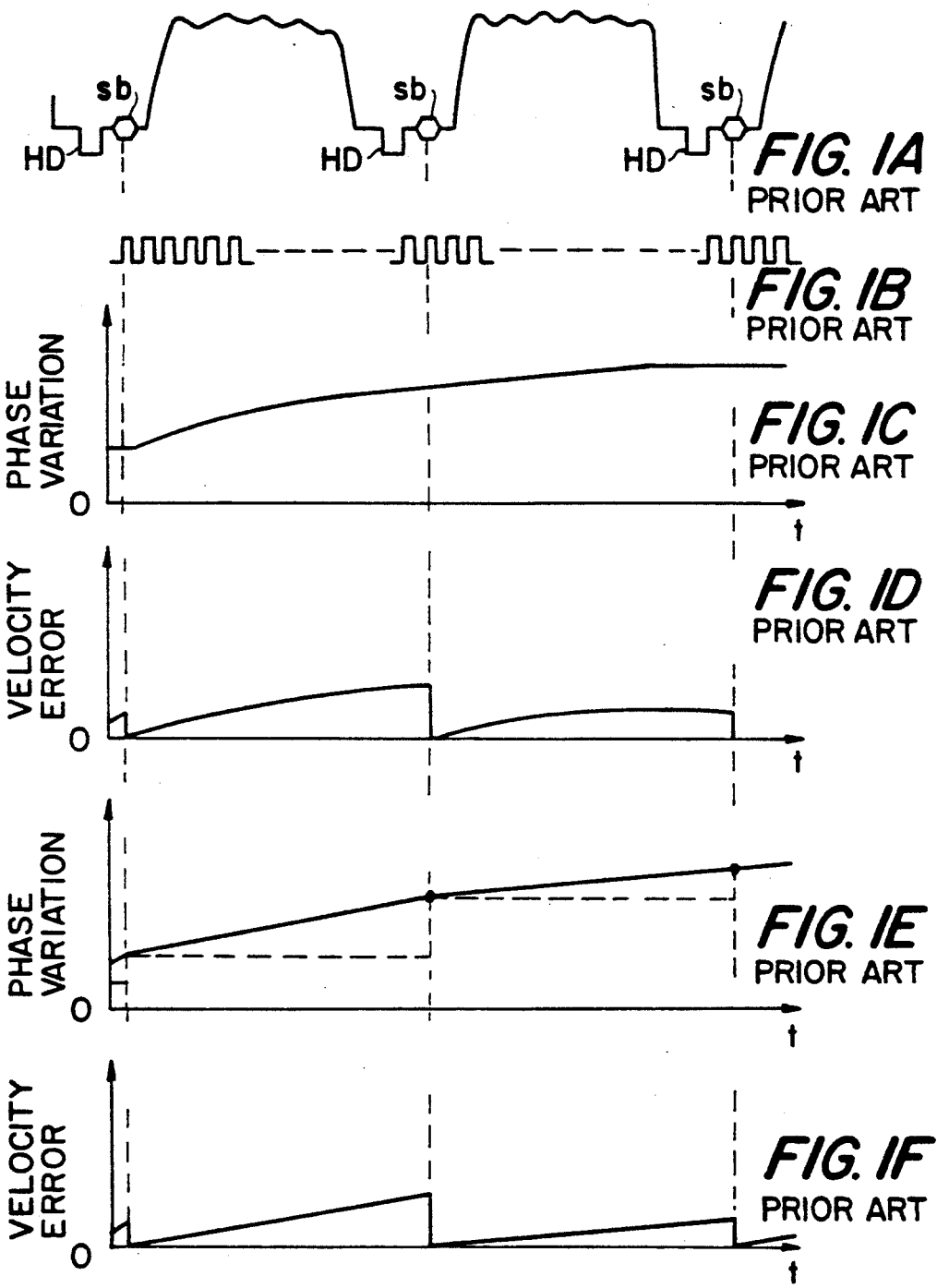
FIGS. 1A to 1F are schematic diagrams for explaining the velocity error and the conventional correction of the velocity error.

An embodiment of the present invention will now be described hereinbelow with reference to the drawings. In FIG. 2, a phase difference signal, namely a velocity error signal is supplied to an input terminal 1. The velocity error is detected by phase comparing a clock signal formed by an APC circuit (not shown) with a burst signal in a color video signal. This velocity error signal is supplied to an A/D converter 2 and converted to digital data one sample of which is constituted by eight (or nine) bits.

An output data from the A/D converter 2 is supplied to a memory 3 to synchronize the velocity error signal with the color video signal which is outputted from a TBC memory (not shown). The velocity error signal which is read out from the memory 3 is supplied to a summing circuit 4, so that the phase difference is converted to the phase shift amount. In this case, since a large dynamic range is needed to convert all data in one field to the phase shift amount data, this conversion is carried out a few samples at a time.

An output signal of the summing circuit 4 is supplied to a zero value interpolation circuit 5. In the interpolation circuit 5, zero values are inserted between the discrete velocity error data for every 1H. Thus, the sampling frequency of an output signal of the interpolation circuit 5 is outwardly multiplied with K.

An output signal of the zero value interpolation circuit 5 is supplied to a digital low-pass filter (LPF) 6 for interpolation. The LPF 6 allows the interpolation data to be respectively generated at the sampling positions of the (K-1) zero data inserted.

An output signal of the LPF 6 is supplied to a differentiation circuit 7. The differentiation circuit 7 detects the value of the difference between two successive sampling values of the output signal of the LPF 6. An output signal of the differentiation circuit 7 is supplied to a linear interpolation circuit 8. The values between the sampling points interpolated by the LPF 6 are further interpolated by the linear interpolation circuit 8. An output signal of the linear interpolation circuit 8 is supplied to a D/A converter 9. An output signal of the D/A converter 9 is taken out at a terminal 11 through a low-pass filter (LPF) 10. The signal taken out at the terminal 11 is fetched as a velocity error at an output terminal 13 through a phase shift amount to phase difference converting circuit 12.

The analog velocity error signal taken out at the output terminal 13 is used as the velocity error signal for phase modulation of the read clock of the TBC memory.

FIG. 3 shows a constitution of the embodiment of the invention, in which a practical constitution between an output terminal (indicated at 2A) of the A/D converter 2 and the output terminal 13 is shown.

The memory 3 consisting of a predetermined number of 1H delay circuits which are serially connected is connected to the terminal 2A. The summing circuit 4 connected to the memory 3 is constituted by a 1H delay circuit 42 and an adder 43. The zero value interpolation circuit 5 connected to an output of the summing circuit 4 comprises two switching circuits 14 and 15 for selectively taking out the output data and zero data of the summing circuit 4. The switching circuits 14 and 15 divide the period of 1H into K equal parts. The sampling data of the velocity error is generated for this period of 1H. The switching circuits 14 and 15 output the zero data as (K-1) sampling data other than the inherent data.

Figure 4A:
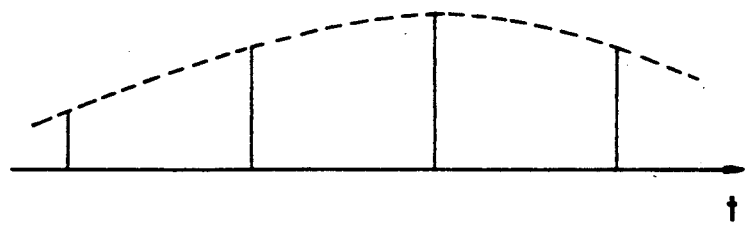
FIGS. 4A to 4J are schematic diagrams for explaining the operation of the embodiment of the invention.
Figure 4B:
Figure 4C:
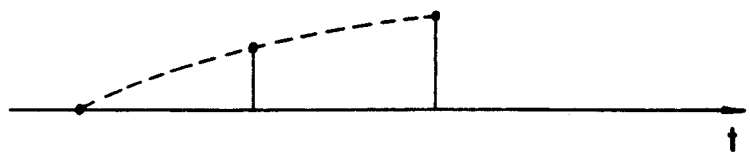
Figure 4D:
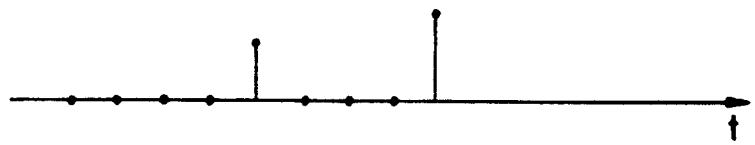

The inherent phase shift amount is shown by a broken line in FIG. 4A. The velocity error signal generated at the terminal 2A is the digital code signal of the sample data shown in FIG. 4B which is generated for every 1H. This velocity error signal is summed, so that the output signal converted to the phase shift amount as shown in FIG. 4C is generated as the output of the summing circuit 4. When K=4, as shown in FIG. 4D, the zero data is inserted as three sampling data by the interpolation circuit 5.

Figure 5A:
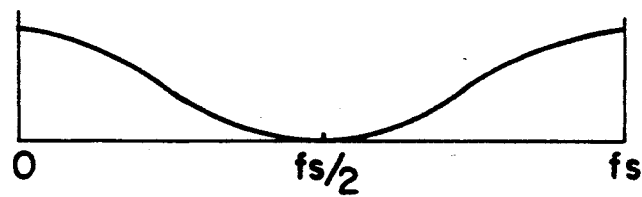
FIGS. 5A to 5C are schematic diagrams for explaining the characteristic of a digital low-pass filter for interpolation.

The output signal of the interpolation circuit 5 is supplied to the digital LPF 6 which is the transversal type filter. Assuming that the sampling frequency is $f_s$ (in this example, the sampling frequency is equal to the horizontal synchronizing frequency), the LPF 6 has the frequency characteristic of the $\cos^2$ curve whose response becomes 0 at the frequency of $\frac{1}{2}f_s$ as shown in FIG. 5A. The impulse response obtained from the frequency characteristic shown in FIG. 5A by performing the inverse Fourier transformation is used as a filter coefficient (FIG. 5B).

Figure 5B:
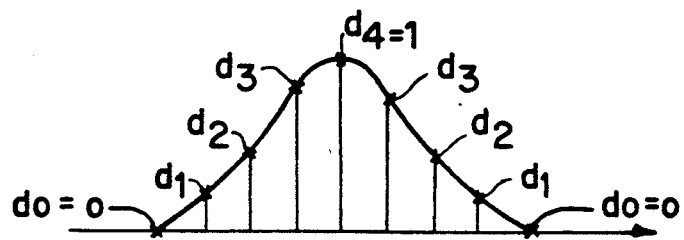
Figure 5C:
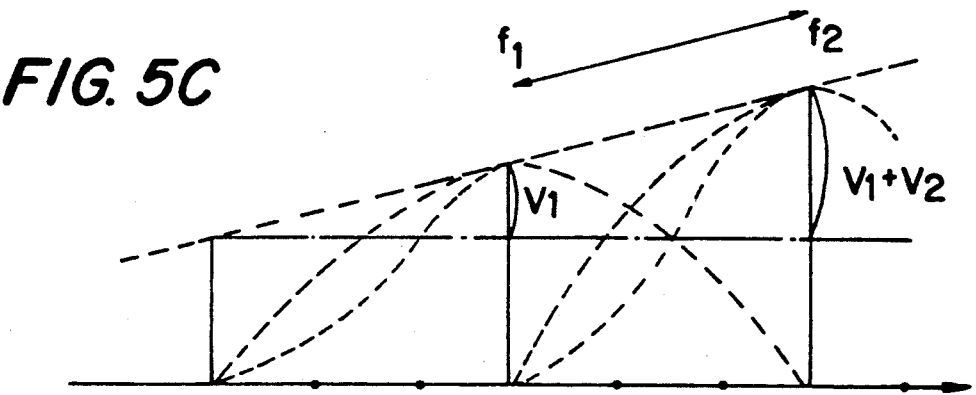

The filter coefficient shown in FIG. 5B relates to the case where the number of interpolating points is three, in which $d_0=0$, $d_1$, $d_2$, and $d_3$ have predetermined magnitudes larger than 0 and less than 1, respectively, and $d_4=1$. FIG. 5C is used for explaining the interpolation using two samples. When the signal of the magnitude of $v_1$ is generated as an output of the 1H delay circuit 42 of the summing circuit 4, the data of the magnitude of $(v_1+v_2)$ is generated from the adder 43. The output signal of the 1H delay circuit 42 is supplied through the switching circuit 15 of the interpolation circuit 5 to serially connected delay circuits of the LPF 6. The output signal of the adder 43 is supplied through the switching circuit 14 of the interpolation circuit 5 to serially connected delay circuits of the LPF 6.

Outputs of the respective delay circuits of the LPF 6 are added by adders and the addition outputs are multiplied with predetermined coefficients $d_1$ to $d_N$, respectively. Therefore, in the interpolating interval as shown by arrows between sampling points $f_1$ and $f_2$ in FIG. 5C, the impulse responses with respect to the sampling points $f_1$ and $f_2$ overlap. With regard to the next sampling points $f_1$, $f_2$, and $f_3$, the values in the interval between the sampling points $f_2$ and $f_3$ are interpolated.

It is also possible to perform the interpolation using three sample data.

An example of the low pass filter 6 to interpolate three points will then be described with reference to FIGS. 6A to 6D and FIGS. 7A to 7D. As shown in the diagrams, this LPF has an input terminal 16 to which the signal generated from the adder 43 of the summing circuit 4 is supplied through the switching circuit 14 and an input terminal 17 to which the signal generated from the 1H delay circuit 42 of the summing circuit 4 is supplied through the switching circuit 15. The input terminal 16 is connected to serially connected delay circuits 18, 19, and 20 each having the delay time corresponding to the sampling period of which 1H was reduced to 1/K by the zero value interpolation circuit 5.

The input terminal 17 is connected to serially connected delay circuits 21, 22, and 23 each having the same delay time as that of the delay circuits 18 to 20. The signal which is derived by adding respective outputs of the delay circuits 18 and 23 is multiplied with the coefficient $d_1$. The signal which is derived by adding outputs of the delay circuits 19 and 22 is multiplied with the coefficient $d_2$. The signal which is derived by adding outputs of the delay circuits 20 and 21 is multiplied with the coefficient $d_3$. The signal from the input terminal 17 is multiplied with the coefficient $d_4$ (=1). These signals multiplied with the respective coefficients are added by an adder 24 and the added signal is taken out at an output terminal 25.

FIGS. 6A to 6D show the states of changes of the respective outputs of the delay circuits 18 to 23 for every predetermined period. FIGS. 6A to 6D correspond to FIGS. 7A to 7D, respectively. The signal $(v_1+v_2)$ is supplied to the input terminal 16 and the signal $v_1$ is supplied to the input terminal 17 at the first timing as shown in FIG. 7A. At this timing, all of the output signals of the delay circuits 18 to 23 are "0", so that the signal $v_1$ is generated at the output terminal 25.

Figure 6A:
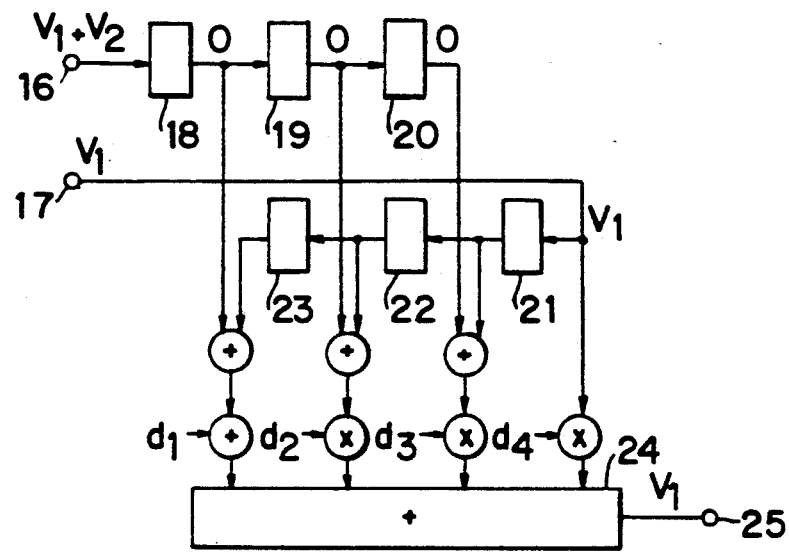
FIGS. 6A to 6D and FIGS. 7A to 7D are block diagrams and schematic diagrams for explaining an example of the digital low-pass filter for interpolation, respectively.
Figure 6B:
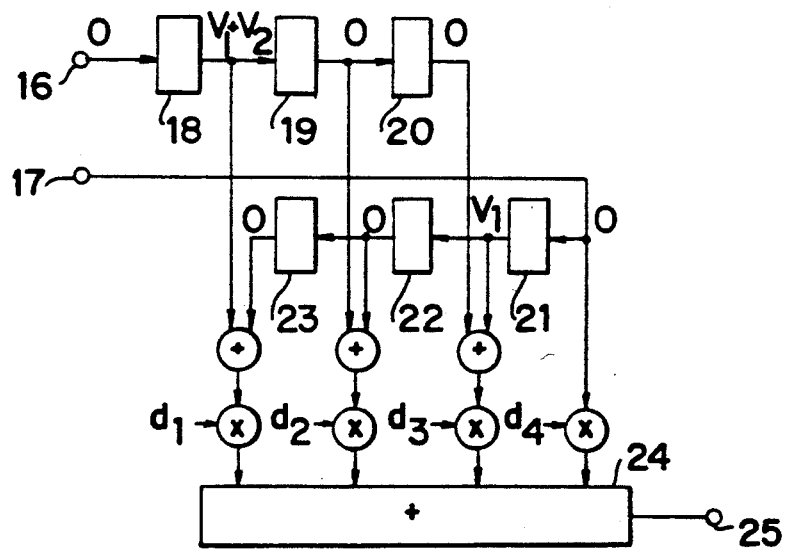
Figure 7A:
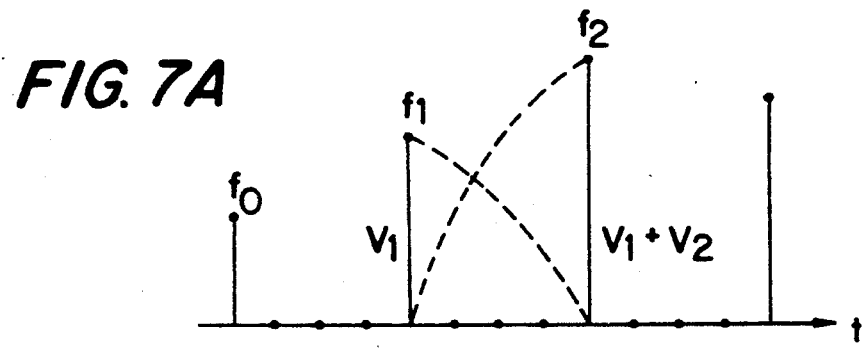
Figure 7B:
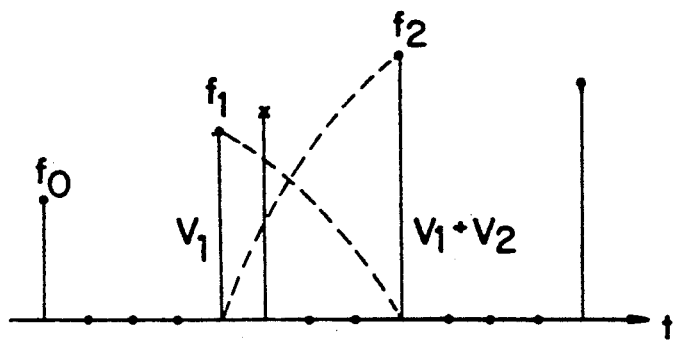
Figure 7C:
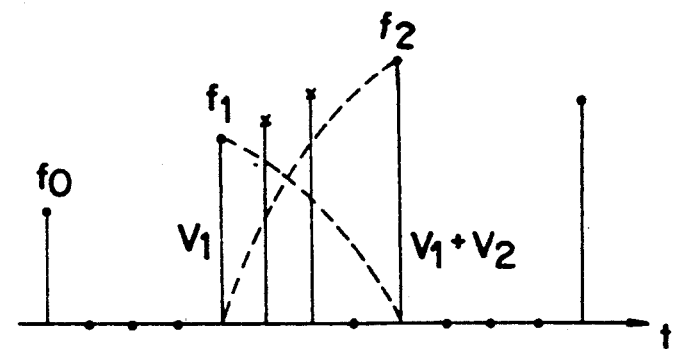
Figure 7D:
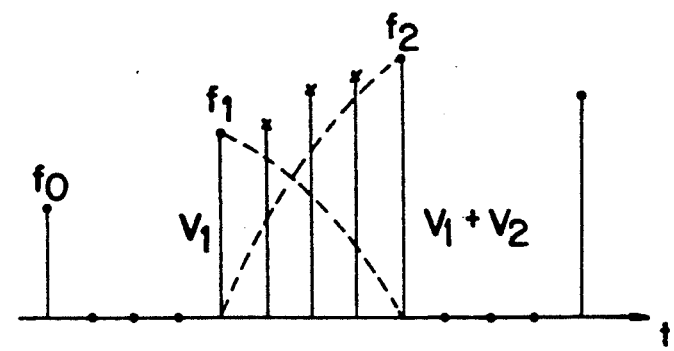

At the timing of the next clock, as shown in FIG. 6B, the signal $(v_1+v_2)$ is generated as the output of the delay circuit 18 and the signal $v_1$ is generated as the output of the delay circuit 21. Thus, the interpolation output shown in FIG. 7B becomes $$d_1 \times (v_1 + v_2) + d_3 \times v_1$$

Figure 6C:
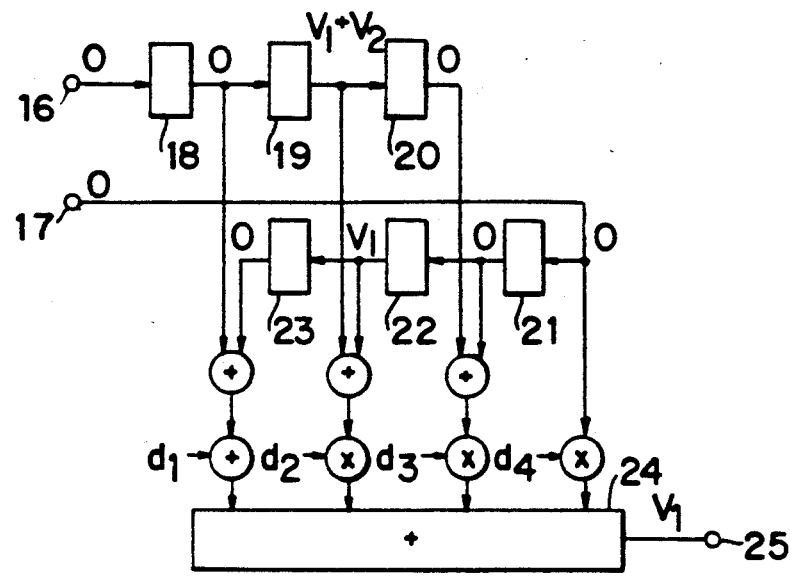

At the timing of the next clock, as shown in FIG. 6C, the signal $(v_1+v_2)$ is generated as the output of the delay circuit 19 and the signal $v_1$ is generated as the output of the delay circuit 22. Thus, the interpolation output shown in FIG. 7C at this time becomes $$d_2 \times \{(v_1+v_2)+v_1\}$$

Figure 6D:
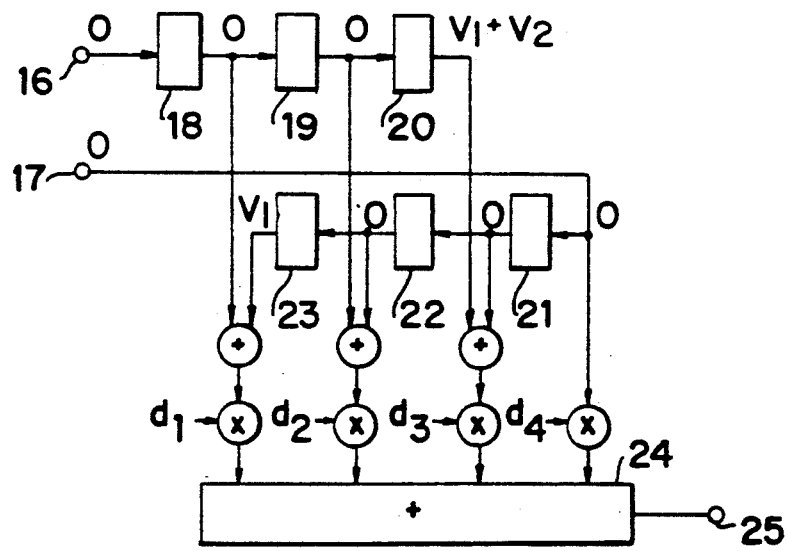

At the timing of the next clock, as shown in FIG. 6D, the signal $(v_1+v_2)$ is generated as the output of the delay circuit 20 and the signal $v_1$ is generated as the output of the delay circuit 23. Thus, the interpolation output shown in FIG. 7D becomes $$d_1 \times v_1 + d_3 \times (v_1+v_2)$$

Figure 4E:
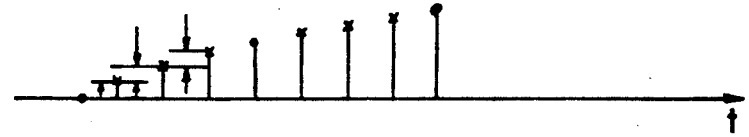

The above operation is repeatedly performed and the interpolated digital signal as shown in FIG. 4E is derived as the output of the digital LPF 6.

Figure 4F:

The differentiation circuit 7 connected to the output terminal of the LPF 6 is constituted by a delay circuit 27 (FIG. 3) and a subtracter 26 for subtracting the data on the output side of the delay circuit 27 from the data on the input side of the delay circuit 27. FIG. 4F represents the output of the differentiation circuit 7, which by action of subtractor 26 is the difference between successive data points.

Figure 4G:

A phase difference data which is generated as an output of the subtracter 26 is supplied to the linear interpolation circuit 8 consisting of a multiplier 28 and an adder 30. A coefficient which sequentially varies is supplied to the multiplier 28 from a terminal 29. In the case of interpolating such that N data is included in the interval between the samples of the output data from the LPF 6, the coefficient of k/N (where k is a data which varies such as 0, 1, 2, . . . , N-1 for every one clock) is supplied to the multiplier 28. Therefore, as shown in FIG. 4G, the output of the linear interpolation circuit 8 is interpolation data having a magnitude that linearly varies was interpolated between the sampling data points as shown in FIG. 4F.

Figure 4H:
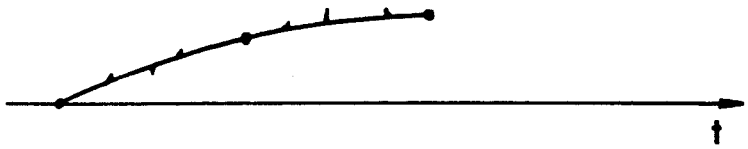
Figure 4I:
Figure 4J:
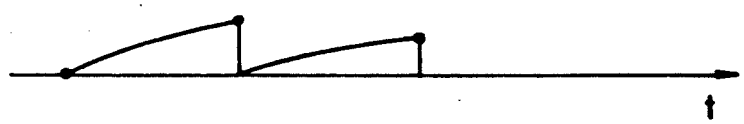

The output signal of the linear interpolation circuit 8 is supplied to the converting circuit 12 through the D/A converter 9 and LPF 10. The outputs of D/A convertor 9 and LPF 10 are shown at FIGS. 4H and 4I, respectively. The converting circuit 12 is constituted by a latch circuit 121 to latch the phase shift amount for every 1H in the output signal of the LPF 10 and a subtracter 122 to subtract an output signal of a latch circuit 121 from the output signal of the LPF 10. The output of converting circuit 12, which by action of subtracting circuit 122 and latch 121 is the difference between successive data points, is shown in FIG. 4J. Therefore, the output signal of the subtracter 122 has a waveform identical to that shown in FIG. 4B and is the velocity error signal. Although the converting circuit 12 was arranged at the post stage of the D/A converter 9 in this embodiment, it may be also arranged at the front stage of the D/A converter 9 as necessary.

Fine interpolation can be also performed in the digital LPF 6 without using the linear interpolation circuit 8. However, in this case, the circuit scale of the LPF 6 increases.

According to the present invention, after the phase difference, i.e., the velocity error was converted to the phase shift amount, the values between the inherent sampling points are interpolated by the digital low-pass filter. Therefore, the velocity error can be accurately corrected as compared with the arrangement in which the values between the inherent sampling points are interpolated by first order interpolation.

Although the present invention has been shown and described with respect to a preferred embodiment, various changes and modifications which are obvious to a person skilled in the art to which the invention pertains are deemed to lie within the spirit and scope of the appended claims.

What is claimed is:

1. Apparatus for generating an improved velocity error signal from a velocity error signal represented by an instantaneous phase difference between burst signals in successive line intervals of a reproduced video signal for use in a time base corrector to remove a time base fluctuation in a color video signal reproduced from a record medium, said apparatus comprising:
    first converting means for converting said phase difference to a summed phase shift amount and generating an output signal proportional thereto;
    interpolating means including a low-pass filter for inserting a plurality of sampling positions between selected values of said output signal of said first converting means, calculating a phase shift amount for each of said plurality of sampling positions and generating a phase shift amount signal; and
    second converting means for converting said phase shift amount signal to a phase difference signal fed to the time base corrector.

2. Apparatus according to claim 1, wherein said first converting means includes a summing circuit for summing said velocity error signal of a present line and of one horizontal line previous thereto.

3. Apparatus for generating an improved velocity error signal from a velocity error signal represented by an instantaneous phase difference between burst signals in successive line intervals of a reproduced video signal for use in a time base corrector to remove a time base fluctuation in a color video signal reproduced from a record medium, said apparatus comprising:
    first converting means including a summing circuit for summing said instantaneous phase differences of a present line and of one horizontal line previous thereto and for converting said phase differences to a summed phase shift amount and generating an output signal proportional thereto;
    means including a sampling rate changing circuit and a transversal type digital low pass filter for interpolating between selected values of said output signal of said first converting means and generating an interpolated phase shift amount signal; and
    second converting means for converting said interpolated phase shift amount signal to a phase difference signal fed to the time base corrector.

4. Apparatus according to claim 3, wherein said sampling rate changing circuit includes a circuit for generating zero values for a period of one horizontal line interval, so that said velocity error signal of a present line and of one horizontal line previous thereto and said zero values are selectively supplied to said digital low pass filter.

5. Apparatus according to claim 4, wherein said second converting means includes a latch circuit for latching said phase difference signal and a subtracting circuit for subtracting an output signal of said latch circuit from said phase difference signal fed thereto.

6. Apparatus for generating an improved velocity error signal representing an instantaneous phase difference between burst signals in successive line intervals of a reproduced color video signal for use in time base correcting fluctuations in the color video signal, comprising:

- a summing circuit for summing the phase differences between burst signals in successive line intervals of the reproduced color video signal and producing therefrom phase shift values;
- a zero value interpolation circuit for inserting a selected number of zero values between the phase shift values of successive lines and producing an output;
- a low-pass transversal filter receiving the output from the zero value interpolation circuit and providing calculated values for the inserted zero values;
- means for determining a difference value between successive calculated values from the low-pass transversal filter;
- a linear interpolation circuit for multiplying a sequentially varying coefficient by successive determined difference values output from the differentiation circuit and the product thereof is added to delayed calculated values from said low-pass transversal filter to produce interpolated output values; and
- a converting circuit for converting the interpolated output values of the linear interpolation circuit to a phase shift signal.

* * * * *